United States Patent [19]

Bagg

[11] Patent Number: 4,746,028
[45] Date of Patent: May 24, 1988

[54] THERMALLY INSULATING SLEEVE FOR A CYLINDRICAL BEVERAGE CONTAINER

[76] Inventor: Robert D. Bagg, 387 Chestnut St., Oneonta, N.Y. 13820

[21] Appl. No.: 918,133

[22] Filed: Oct. 14, 1986

[51] Int. Cl.4 .................. B65D 23/08; B65D 23/10
[52] U.S. Cl. .................. 220/85 H; 150/52 R; 215/12.2; 215/100 R; 215/100 A; 220/94 R; 220/411; 220/903
[58] Field of Search .............. 150/52 R; 215/100 R, 215/100 A, 13 R, 12 A, 12.2, 13.1; 220/85 H, 94 R, 903, 411; 224/148; 294/27.1; 62/457; 229/1.5 H

[56] References Cited

U.S. PATENT DOCUMENTS

| | | | |
|---|---|---|---|
| 2,122,628 | 7/1938 | Tracy | 215/100 A |
| 3,261,635 | 7/1966 | Talay | 215/100 A X |
| 3,302,427 | 2/1967 | Stoner et al. | 62/457 |
| 3,353,729 | 11/1967 | Hull | 220/94 R |
| 4,281,520 | 8/1981 | Norwood | 62/457 X |
| 4,282,279 | 8/1981 | Strickland | 150/52 R X |
| 4,383,422 | 5/1983 | Gordon et al. | 62/457 |
| 4,399,668 | 8/1983 | Williamson | 215/13 R X |
| 4,452,369 | 6/1984 | Rhodes | 215/100.5 X |
| 4,478,265 | 10/1984 | DeMarco | 150/52 R |

Primary Examiner—William Price
Assistant Examiner—Sue A. Weaver
Attorney, Agent, or Firm—Eric P. Schellin

[57] ABSTRACT

The present invention is directed to a thermally insulating sleeve, that is mounted on a disposable beverage container, having an outwardly projecting handle. The sleeve is both flexible and resilient so that it grips the sidewalls of the container. The handle is C-shaped and provided with a mounting flange located inside of the sleeve. The mounting flange is provided with an arcuate inner surface for engaging the cylindrical sidewalls of a beverage container.

1 Claim, 1 Drawing Sheet

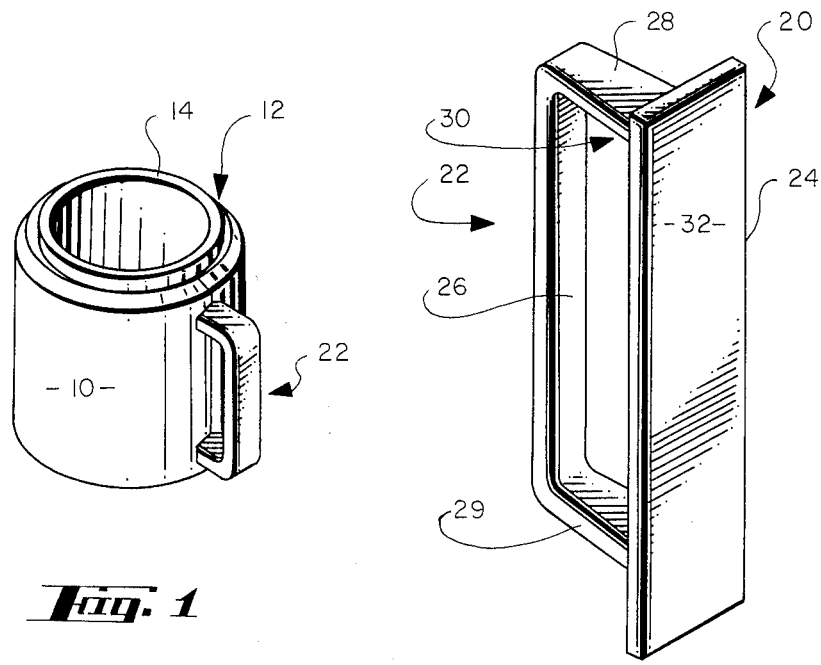
Fig. 1
Fig. 3
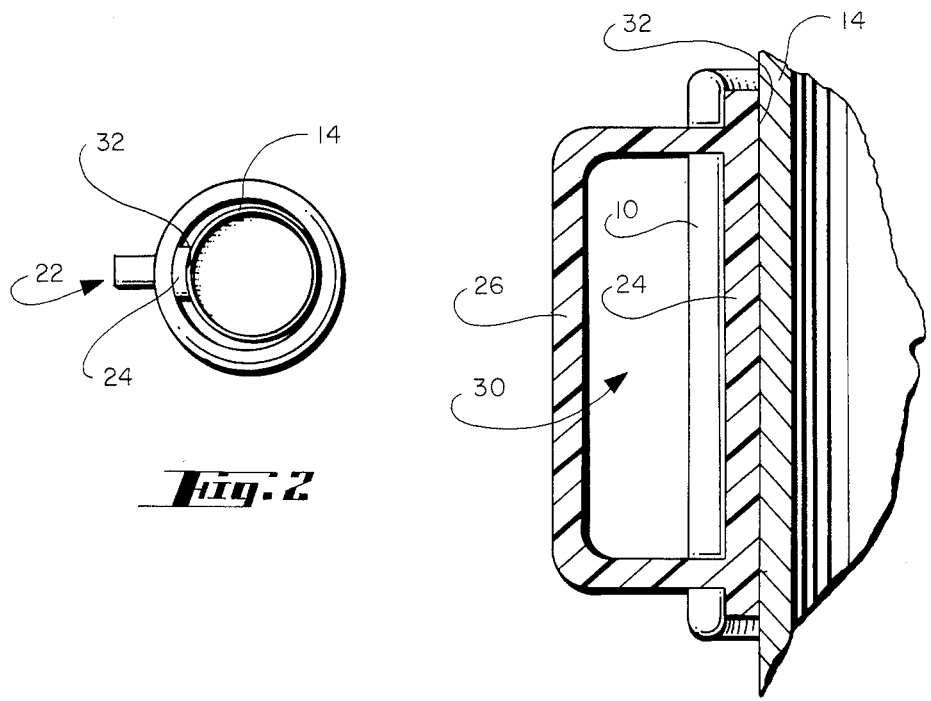
Fig. 2
Fig. 4

THERMALLY INSULATING SLEEVE FOR A CYLINDRICAL BEVERAGE CONTAINER

BACKGROUND OF THE INVENTION

1. Field of the Invention

The invention is directed to a thermally insulating sleeve having an outwardly projecting handle for insulating and providing a handling assembly for a beverage container.

2. Description of the Prior Art

Ready to drink beverages, such as beer and soft drinks, are typically stored and sold in disposable containers. Beverages in the containers can be consumed directly from the containers. The containers can either be metallic cans, or glass or plastic bottles. Cans are widely used because they can be quickly chilled and maybe provided with a readily openable dispensing opening such as a pop top. However the metallic cans can also quickly return to ambient temperature because of their good heat transfer characteristics. In addition cans can be cold to the touch and sweat in hot humid conditions.

To alleviate these problems both bottles and cans have been provided with insulation jackets. Such jackets are usually formed from a plastic foam and grip the sidewalls of the container. A user can then grip the insulation jacket instead of the containers sidewalls directly, substantially eliminating heat transfer between the hand and the container, and reducing heat transfer from the ambient environment. Such insulation jackets have been very successful in keeping beverages, stored in containers, cold during consumption.

Detachable handles have also been proposed for gripping a beverage can so that the user has the feeling of the ambiance of drinking from a mug rather than a can. As such the user's hand does not directly contact the can, eliminating heat transfer at this point. Such handles are usually made of metal and present other heat transfer problems in keeping the can cold.

SUMMARY

The present invention provides a flexible and resilient insulation sleeve that grips the sidewalls of a beverage container. The sleeve is also provided with a handle extending outward from the sleeve that is used for manipulating the beverage can by the user. As such the present invention substantially reduces heat transfer from the ambient environment and a user's hand. It also provides a beverage system that provides a greater ambiance in drinking a beverage from a can or other similar container.

The sleeve has a tubular configuration with an open top. The handle means comprises a C-shaped member that is generally parallel to the sidewall of a can positioned in the sleeve. The handle means comprises a C-shaped member that is generally parallel to the sidewall of a can positioned in the sleeve. The handle means is further provided with a mounting flange having an arcuate shaped inner surface that engages the sidewall of the container positioned in the sleeve.

BRIEF DESCRIPTION OF THE DRAWINGS

FIG. 1, is a perspective view of the insulated sleeve having an outwardly projecting handle for gripping a beverage container pleaced therein.

FIG. 2 is a plan view of the insulated sleeve and outwardly projecting handle.

FIG. 3 is a perspective view of the handle means.

FIG. 4 is a partial cross sectional view of the handle means which is mounted in the insulated sleeve which is gripping a beverage container.

DETAILED DESCRIPTION

The present invention is adapted and constructed to insulate a disposable beverage container such as a twelve ounce can of beer or a bottle of soft drink. However it should be noted that the present invention can be used in conjunction with other applications such as insulating a beverage containing glass or similar receptacle.

In a preferred embodiment of the invention, the invention comprises a flexible and resilient insulating sleeve 10 which is tubular in nature having an open bottom and open top 12. The sleeve may be formed from a foam resin material that provides good insulation while also providing a resilient structure adapted to grip a beverage container therein. Beverage container 14 is placed into sleeve 10 through either its open top or open bottom. The sleeve is adapted and constructed to have a tubular opening smaller than the container so that as it is slipped over the container it compresses around the sidewalls of the container gripping them tightly.

Alternatively the sleeve can be formed from an insulating foam that is located between two fabric layers. Either one or both of the fabric layers are flexible and resilient providing the gripping force necessary for mounting the sleeve to the container. However no matter what the specific structure, the overall sleeve must be both flexible and resilient so that it can be placed over the beverage container tightly gripping its sides.

In either embodiment, the sleeve maybe provided with indicia on its outside walls.

The sleeve is also provided with handle means 20 formed from a rigid thermoplastic comprising C-shaped gripping member 22 that is secured to mounting flange 24. The C-shaped gripping member comprises elongated web portion 26 and two inwardly directed tang portions 28 and 29. the C-shaped member defines hand opening 30 through which user grips the handle and thereby the sleeve held container.

The two inwardly directed tang portions project through the sleeve and are secured to the mounting flange which is located inside the tubular portion the sleeve. The mounting flange has an arcuate shaped inner surface 32 which engages the cylindrical sidewall of a container located in the sleeve.

The elongated web portion of the handle means is arranged parallel to the tubular sleeve and perpendicular to the open top. As such it is arranged in a manner similar to a conventional mug creating a certain ambiance in drinking from a disposable beverage container.

The scope of the present invention should not be limited by the above described embodiments, but should be limited solely by the claims that follow.

I claim:

1. A wrap around apparatus for thermally insulating the outside of a tubular container comprising:
   a flexible and resilient tubular sleeve of insulating material;
   said sleeve having two axially and linearly displaced openings;
   a rigid C-shaped axially disposed handle means perpendicular and external of said sleeve having an axial elongated web portion and two inwardly projecting spaced tang portions defining a hand opening for gripping the handle means;

said tang portions extending internally of said sleeve through said openings in the sleeve, an axially disposed mounting flange positioned inside of the sleeve and secured to the two inwardly projecting tang portions of the handle means.

* * * * *